A. SYVERSON.

Assignor of one-half interest to J. S. DENNIS.

Sheet-Metal Elbow.

No. 8,031. Reissued Jan. 8, 1878.

WITNESSES.,

W. C. Corlies.

L. A. Bunting

INVENTOR.,

ANDREW SYVERSON.

BY Osburn & Thacher

ATTORNEYS.

N. PETERS, PHOTO-LITHOGRAPHER, WASHINGTON, D. C.

UNITED STATES PATENT OFFICE.

ANDREW SYVERSON, OF CHICAGO, ILLINOIS, ASSIGNOR OF ONE-HALF INTEREST TO JOSEPH S. DENNIS, OF SAME PLACE.

IMPROVEMENT IN SHEET-METAL ELBOWS.

Specification forming part of Letters Patent No. 180,736, dated August 8, 1876; Reissue No. 8,031, dated January 8, 1878; application filed September 27, 1877.

*To all whom it may concern:*

Be it known that I, ANDREW SYVERSON, of the city of Chicago, in the county of Cook and State of Illinois, have invented a new and useful Improvement in Sheet-Metal Elbows, which is fully described in the following specification, reference being had to the accompanying drawings, in which—

Figure 1:
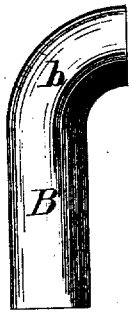
Figure 2:
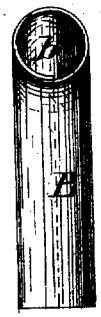
Figure 3:
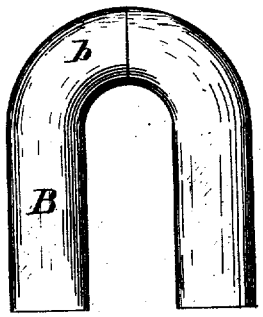

Figure 1 is a side elevation of my improved elbow; Fig. 2, a front elevation of the same, looking toward the seam; Fig. 3, a side elevation of a double elbow; and Fig. 4, a plan view of the peculiar blank from which the elbow is formed.

The object of my invention is to make a sheet-metal elbow in one piece and with only one seam, having a smooth surface both inside and outside, and the bent part of which is in the arc of a circle or on a curved line.

The invention consists in a sheet-metal blank of peculiar shape, whereby, when bent to form an elbow, the edges are brought close together at the bent end.

It also consists in making the elbow from a blank of sheet metal of substantially the shape shown and of ordinary uniform thickness.

It also consists in a sheet-metal elbow made from a single blank, of substantially the shape shown and of uniform thickness, without crimping or cutting, and with a smooth surface both upon the inside and outside thereof.

Figure 4:
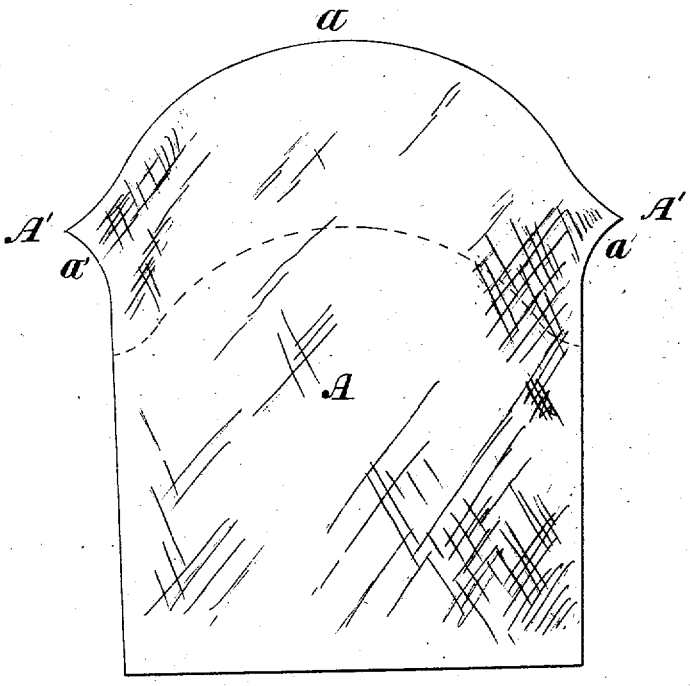

In the drawings, A represents a blank cut from sheet metal, from which the elbow is to be formed. The edge *a* upon the end of the blank, which is to form the bend or curve in the pipe, is convex, as shown in Fig. 4 of the drawings. The sides and other end of the blank are straight; but where the curved and lateral edges join there are pointed and curved projections A′, one on each side of the blank, as clearly shown in Fig. 4 of the drawings.

This blank is placed in a machine made for that purpose, and the vertical or straight edges are crowded together, the convex end of the blank being at the same time drawn so as to give a curved form or elbow to the upper end of the pipe or section of pipe B, thus forming a continuous and smooth elbow, *b*, thereon, as shown in Figs. 1 and 2 of the drawings. In this operation the points or projections A′ and their edges *a′* are brought together at the inner curve of the elbow, as shown in Fig. 2 of the drawings, thereby completely closing up the gap which would be left if the sides of the blank were perfectly straight throughout and the projections A′ were dispensed with.

When the blank is made of the form shown, and then bent and drawn, as described, the extreme or outer end of the completed elbow will be at right angles, or nearly so, to the other end of the pipe or section, which is left nearly straight.

This angle, however, may be varied by changing the form of the blank; and the two sections may be arranged with relation to each other at an angle of about forty-five degrees, even if the blank is made without the projections A′, of the form shown below the dotted line in Fig. 4 of the drawings; but a sharper curve, like that described above and shown in the drawings, cannot be given to the elbow without the projections.

When the blank has been bent or formed, as described, the edges which make the seam may be either soldered to each other, when the metal will admit of soldering, or riveted together when it will not, the kind of metal of which the pipe is made determining the mode of fastening the edges together.

When the pipe is made of a metal which will admit of soldering the edges need not be lapped; but if riveted, of course they must overlap.

I am aware that curved sheet-iron elbows alone, having smooth surfaces and only one seam, have heretofore been made; but two sections of pipe cannot be joined by means of such elbows without producing at least three joints between the parts so united, whereas there will be only one joint where two sections of my elbowed pipe are united, as shown in Fig. 3.

I am also aware that a smooth-surfaced curved sheet-iron elbow has been made from a blank of peculiar construction, as shown and described in Letters Patent No. 154,760, granted to George Lupton, September 8, 1874.

I am also aware that soft-metal tubes or pipes, made from blanks, have been curved without being perceptibly crimped or corrugated; but an uncrimped or uncorrugated hard-metal pipe, made from an ordinary blank, and curved at the end, so as to form an elbow continuous therewith, and having only one seam, substantially as herein shown and described, has not, so far as I am aware, ever before been made.

I am also aware that both soft and hard metal elbowed pipes have been produced by casting the metal into such a form.

Having thus described my invention, what I claim, and desire to secure by Letters Patent, is—

1. A blank, A, having a convex edge at the end, which is to be bent to form the curve or elbow in the pipe, and projections A′ at the junction of this edge with the lateral edges, substantially as and for the purpose set forth.

2. A sheet-metal blank of uniform thickness, and of substantially the shape shown at the elbow end, whereby it is adapted to be drawn and bent into the form of a pipe-elbow, substantially as set forth.

3. A sheet-metal elbow made of a single blank of sheet-iron of uniform thickness, having a single longitudinal seam, the elbow being formed without crimping or cutting, and presenting a smooth surface throughout when finished, substantially as shown and described.

ANDREW SYVERSON.

Witnesses:
J. C. MAC GREGOR,
W. C. CORLIES.